(12) United States Patent
Zaech

(10) Patent No.: US 11,988,251 B2
(45) Date of Patent: May 21, 2024

(54) ELASTIC BEARING

(71) Applicant: Siemens Mobility GmbH, Munich (DE)

(72) Inventor: Martin Zaech, Raubling (DE)

(73) Assignee: Siemens Mobility GmbH, Nuremberg (DE)

( * ) Notice: Subject to any disclaimer, the term of this patent is extended or adjusted under 35 U.S.C. 154(b) by 0 days.

(21) Appl. No.: 17/768,042

(22) PCT Filed: Jul. 22, 2020

(86) PCT No.: PCT/EP2020/070674
§ 371 (c)(1),
(2) Date: Apr. 11, 2022

(87) PCT Pub. No.: WO2021/069123
PCT Pub. Date: Apr. 15, 2021

(65) Prior Publication Data
US 2024/0093726 A1 Mar. 21, 2024

(30) Foreign Application Priority Data
Oct. 10, 2019 (DE) ...................... 10 2019 215 570.7

(51) Int. Cl.
*F16C 27/06* (2006.01)
*F16C 27/02* (2006.01)
*F16F 1/38* (2006.01)

(52) U.S. Cl.
CPC ............ *F16C 27/063* (2013.01); *F16C 27/02* (2013.01); *F16F 1/38* (2013.01)

(58) Field of Classification Search
CPC . F16C 27/02; F16C 27/063; F16F 1/38; F16F 1/3835; F16F 1/3863
See application file for complete search history.

(56) References Cited

U.S. PATENT DOCUMENTS

| | | | | |
|---|---|---|---|---|
| 4,588,174 A | * | 5/1986 | Konishi | F16F 13/14 267/141.2 |
| 4,919,401 A | * | 4/1990 | Yano | F16F 13/14 267/140.2 |

(Continued)

FOREIGN PATENT DOCUMENTS

| | | |
|---|---|---|
| CN | 105805202 A | 7/2016 |
| CN | 106795932 A | 5/2017 |

(Continued)

*Primary Examiner* — Phillip A Johnson
(74) *Attorney, Agent, or Firm* — Laurence A. Greenberg; Werner H. Stemer; Ralph E. Locher

(57) ABSTRACT

An elastic bearing has an inner body, an outer body and an elastic layer. The outer body surrounds the inner body such that the outer body and the inner body have a common longitudinal axis, which forms the bearing longitudinal axis as a first spatial axis of a 3D coordinate system. The elastic layer is positioned between the outer body and the inner body. In the direction of a second spatial axis, a distance between the outer body and the inner body is minimal, and free from the elastic layer. In the direction of a third spatial axis, the distance between the outer body and the inner body is always the same, and the elastic layer is arranged therein in order to fill that spacing gap.

1 Claim, 5 Drawing Sheets

(56) References Cited

U.S. PATENT DOCUMENTS

| | | | | |
|---|---|---|---|---|
| 5,725,202 | A | * | 3/1998 | Nakamura ............ F16F 1/3835 |
| | | | | 267/219 |
| 7,219,882 | B2 | * | 5/2007 | Kato ................... F16F 13/1445 |
| | | | | 267/141.2 |
| 7,867,097 | B2 | | 1/2011 | Maierbacher et al. |
| 2016/0208879 | A1 | | 7/2016 | Conrad et al. |

FOREIGN PATENT DOCUMENTS

| | | | |
|---|---|---|---|
| DE | 2621787 | A1 | 12/1977 |
| DE | 102004051566 | A1 | 5/2006 |
| DE | 102007012772 | A1 | 10/2008 |
| DE | 202008011149 | U1 | 10/2008 |
| DE | 102017103779 | A1 | 8/2018 |
| DE | 102017120321 | B3 | 12/2018 |
| EP | 0905405 | A1 | 3/1999 |
| EP | 2905503 | A2 | 8/2015 |
| EP | 3631221 | B1 * | 4/2022 ............. F16C 27/02 |
| WO | WO 9408807 | A1 | 4/1994 |
| WO | 2016078828 | A1 | 5/2016 |
| WO | WO 2018196901 | A1 | 11/2018 |

\* cited by examiner

ELASTIC BEARING

FIELD AND BACKGROUND OF THE INVENTION

The invention relates to an elastic bearing.

Elastic bearings of this type are known from the prior art in the form of what are known as rubber-metal bearings. FIG. 5 shows the structure of a rubber-metal bearing GML3.

The rubber-metal bearing GML3 has a hollow outer cylinder AR3, which forms an outer side or an outer body of the rubber-metal bearing GML3. The rubber-metal bearing GML3 has a hollow inner cylinder IR3, which forms an inner side or an inner body of the rubber-metal bearing GML3.

The outer cylinder AR3 annularly encloses the inner cylinder IR3, with the result that the two cylinders have a common longitudinal axis. This common longitudinal axis is referred to as bearing longitudinal axis LA3 and in this illustration forms a first spatial axis or x axis of a spatial coordinate system.

A cylindrical elastic layer GUMS, which is manufactured from rubber, for example, is in this instance by way of example arranged between the outer cylinder AR3 and the inner cylinder IR3 in an annularly encircling manner, with the result that its axis also coincides with the bearing longitudinal axis LA3.

In the illustrated spatial coordinate system with the three spatial axes x, y and z which are mutually perpendicular at a common point, the rubber-metal bearing GML3 has the following six degrees of freedom:
- rotational (turning) movement of bearing elements about the bearing longitudinal axis LA3 or about the x axis,
- rotational movement or tilting movement of bearing elements about the y axis,
- rotational movement or tilting movement of bearing elements about the z axis,
- translational movement of bearing elements in the direction of the bearing longitudinal axis LA3 or in the direction of the x axis,
- translational movement of bearing elements in the direction of the y axis, and
- translational movement of bearing elements in the direction of the z axis.

In technical applications, it can be advantageous to use a rubber-metal bearing with limited degrees of freedom. For example, it can be advantageous to prevent or to selectively reduce at least a translational movement of the rubber-metal bearing in one spatial direction.

Document EP 2 905 503 A2 discloses a bearing with restricted degrees of freedom. Rotational movements of bearing components in the bearing longitudinal direction and in the direction of two spatial axes perpendicular thereto are blocked. A translational movement of the bearing components in the bearing longitudinal direction is possible, whereas translational movements of the bearing components in the direction of spatial axes perpendicular to the bearing longitudinal direction are blocked.

Document EP 0 905 405 A1 discloses a bearing. A rotational movement of bearing components in the bearing longitudinal direction and in the direction of two spatial axes perpendicular thereto is possible to a partially restricted extent. A translational movement of the bearing components in the bearing longitudinal direction and in the direction of the spatial axes perpendicular thereto is possible to a restricted extent.

Document E 10 2017 103 779 A1 discloses a bearing with restricted degrees of freedom. Rotational movements of bearing components in the bearing longitudinal direction and in the direction of two spatial axes perpendicular thereto are blocked. A translational movement of the bearing components in the bearing longitudinal direction is possible, whereas translational movements of the bearing components in the direction of spatial axes perpendicular to the bearing longitudinal direction are possible to a restricted extent.

SUMMARY OF THE INVENTION

The object of the present invention is to specify a rubber-metal bearing with limited degrees of freedom.

This object is achieved by the features of claim 1 as claimed.

The invention relates to an elastic bearing with an inner body, an outer body and with an elastic layer. In this respect, the outer body encloses the inner body in such a way that their longitudinal axes are parallel to a first spatial axis of a spatial coordinate system.

The elastic layer is positioned between the outer body and the inner body. In the direction of a second spatial axis, the outer body and the inner body have a minimum spacing from one another which is free of the elastic layer. In the direction of a third spatial axis, the outer body and the inner body have an identical spacing from one another in which the elastic layer is arranged, in order to fill the identical spacing.

In a preferred embodiment, the term "minimum spacing" is to be understood to mean that, within the context of manufacturing tolerances, the spacing is reduced to an air gap of small or smallest extent, or that in the extreme case the inner body and the outer body touch.

According to the invention, the outer body and the inner body have an annular shape or a hollow cylindrical basic shape.

According to the invention, the elastic layer is manufactured from rubber.

In a configuration which is not claimed, in the direction of the second spatial axis the outer body and the inner body each have an area, wherein these areas in turn have a minimum spacing from one another.

According to the invention, in the direction of the second spatial axis the outer body and the inner body have a minimum spacing from one another along a line parallel to the first spatial axis.

According to the invention, the outer body encloses the inner body in such a way that longitudinal axes of the outer body and of the inner body are in line and thus form a common bearing longitudinal axis, which corresponds to the first spatial axis of the spatial coordinate system.

By virtue of the present invention, the geometry of the elements of the rubber-metal bearing is adapted in such a way that at least one degree of freedom is blocked.

The present invention provides a rubber-metal bearing which has blocked degrees of freedom and is used in particular in active chassis of rail vehicles.

The present invention would make it possible for example for the active element to define the rigidity in one spatial direction in the case of the active chassis. This spatial direction is then blocked for the other elastic elements in the load path of the chassis.

The present invention enables new chassis designs which are not realizable in accordance with the known prior art.

BRIEF DESCRIPTION OF THE FIGURES

The present invention will be explained in more detail below by way of example and with reference to a drawing. In the figures.

DETAILED DESCRIPTION OF THE INVENTION

Figure 1:
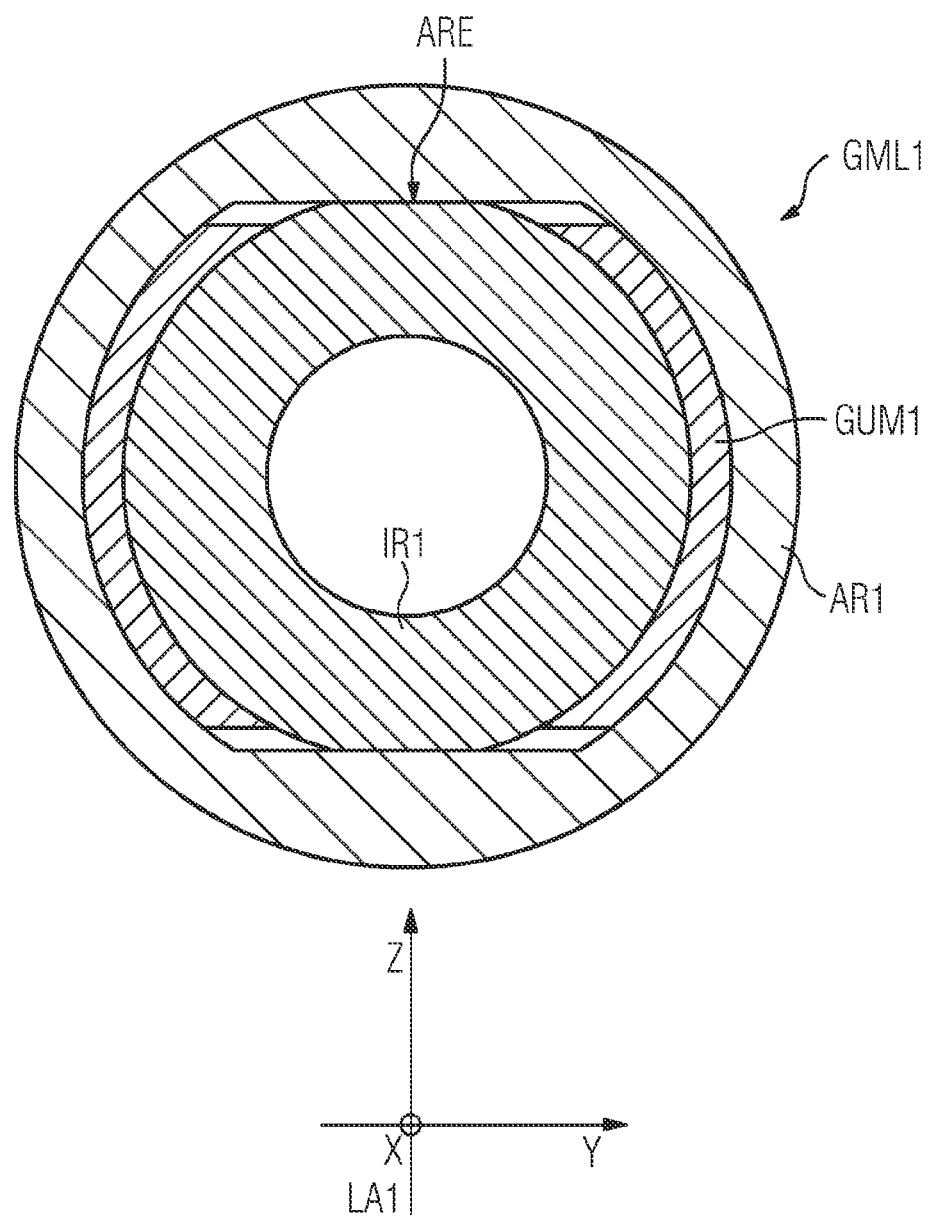
FIG. 1 shows an exemplary embodiment, which is not claimed, with respect to the present invention.

FIG. 1 shows a rubber-metal bearing GML1 which is not claimed.

The rubber-metal bearing GML1 has an outer body AR1, which preferably has a hollow cylindrical basic shape and forms an outer side of the rubber-metal bearing GML1.

The rubber-metal bearing GML1 has an inner body IR1, which preferably has a hollow cylindrical basic shape and forms an inner side of the rubber-metal bearing GML1.

The outer body AR1 encloses the inner body IN1 in such a way that the two rings have a common axis of symmetry in the form of a bearing longitudinal axis LA1.

In the illustrated spatial coordinate system with the three spatial axes x, y and z which are mutually perpendicular at a common point, the bearing longitudinal axis LA1 forms the x axis.

A rubber layer GUM1 is arranged in the form of an elastic layer annularly between the outer body AR1 and the inner body IR1 as follows:

In the direction of the z axis, the outer body AR1 has a minimum spacing from the inner body IR1 in which no rubber layer GUM1 is arranged or which is free of the rubber layer GUM1.

In this exemplary embodiment, the outer body AR1 extensively touches the inner body IR1 over an area ARE.

In the direction of the y axis, the outer body AR1 has a substantially constant spacing from the inner body IR1 in which the rubber layer GUM1 is at least partially arranged.

In this way, some degrees of freedom of the rubber-metal bearing GML1 are blocked.

By virtue of this embodiment, the rubber-metal bearing GML1 has the following degrees of freedom:
- rotational (turning) movement of the bearing elements about the z axis,
- translational movement of the bearing elements in the direction of the bearing longitudinal axis LA1 or x axis, and
- translational movement of the bearing elements in the direction of the y axis.

Correspondingly, by virtue of this embodiment the following degrees of freedom of the rubber-metal bearing GML1 are blocked:
- rotational (turning) movement of the bearing elements about the bearing longitudinal axis LA1 or about the x axis,
- rotational (turning) movement of the bearing elements about the y axis, and
- translational movement of the bearing elements in the direction of the z axis.

Figure 2:
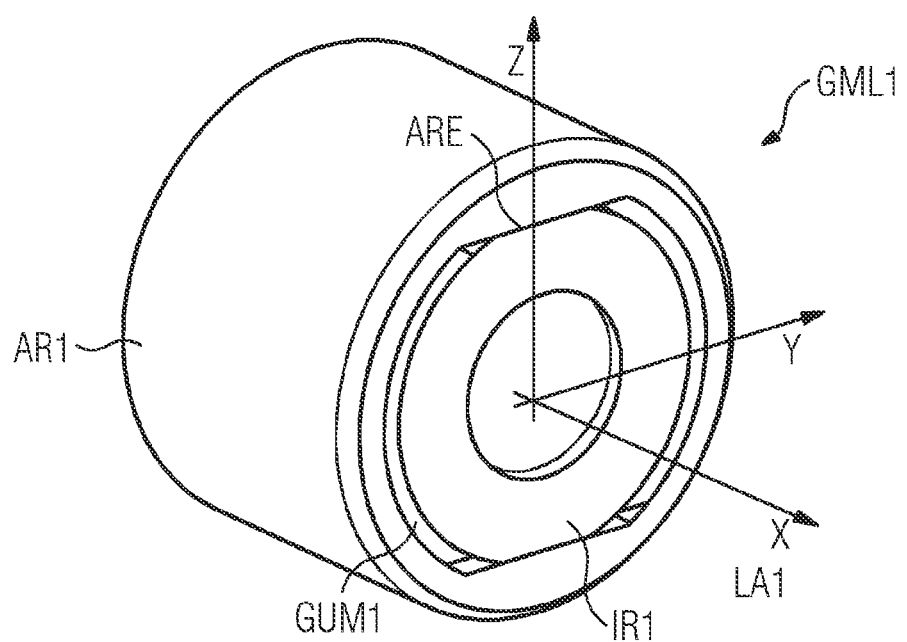
FIG. 2 shows a three-dimensional illustration of the exemplary embodiment with respect to FIG. 1.

FIG. 2 shows a three-dimensional illustration of the exemplary embodiment of the present invention with respect to FIG. 1.

Figure 3:
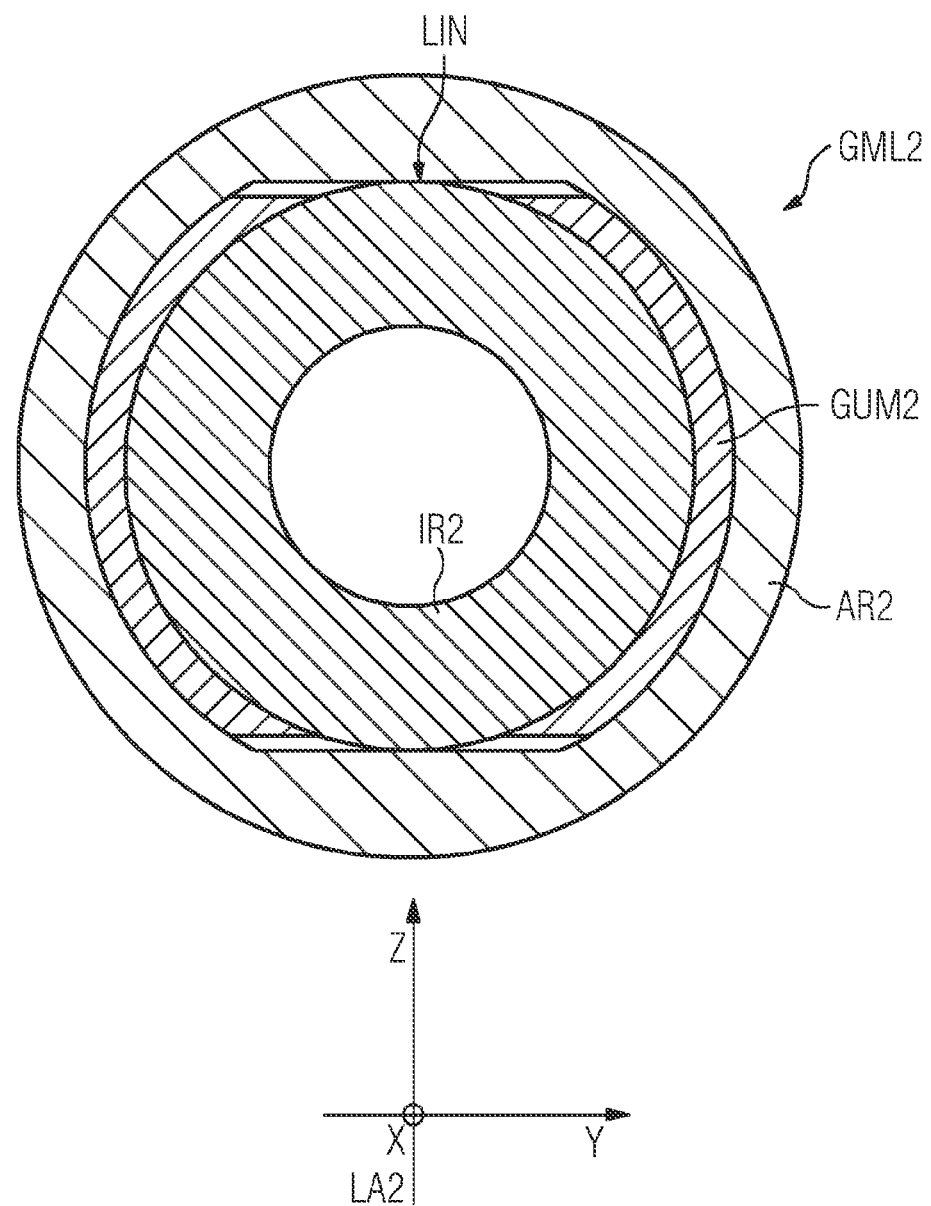
FIG. 3 shows an exemplary embodiment of the present invention.

FIG. 3 shows a second rubber-metal bearing GML2 according to the invention.

The rubber-metal bearing GML2 has an outer body AR2, which preferably has a hollow cylindrical basic shape and forms an outer side of the rubber-metal bearing GML2.

The rubber-metal bearing GML2 has an inner body IR2, which preferably has a hollow cylindrical basic shape and forms an inner side of the rubber-metal bearing GML2.

The outer body AR2 encloses the inner body IN2 in such a way that the two rings have a common axis of symmetry in the form of a bearing longitudinal axis LA2.

In the illustrated spatial coordinate system with the three spatial axes x, y and z which are mutually perpendicular at a common point, the bearing longitudinal axis LA2 forms the x axis.

A rubber layer GUM2 is arranged in the form of an elastic layer annularly between the outer body AR2 and the inner body IR2 as follows:

In the direction of the z axis, the outer body AR2 has a minimum spacing from the inner body IR2 in which no rubber layer GUM2 is arranged or which is free of the rubber layer GUM2.

In this exemplary embodiment, the outer body AR2 touches the inner body IR2 along a line LIN which is parallel to the x axis.

In the direction of the y axis, the outer body AR2 has a substantially constant spacing from the inner body IR2 in which the rubber layer GUM2 is at least partially arranged.

In this way, degrees of freedom of the rubber-metal bearing GML2 are again blocked.

By virtue of this embodiment, the rubber-metal bearing GML2 has the following degrees of freedom:
- rotational (turning) movement of the bearing elements about the bearing longitudinal axis LA2 or about the x axis,
- rotational (turning) movement of the bearing elements about the z axis,
- translational movement of the bearing elements in the direction of the bearing longitudinal axis LA2 or x axis, and
- translational movement of the bearing elements in the direction of the y axis.

Correspondingly, by virtue of this embodiment the following degrees of freedom of the rubber-metal bearing GML2 are blocked:
- rotational (turning) movement of the bearing elements about the y axis, and
- translational movement of the bearing elements in the direction of the z axis.

Figure 4:
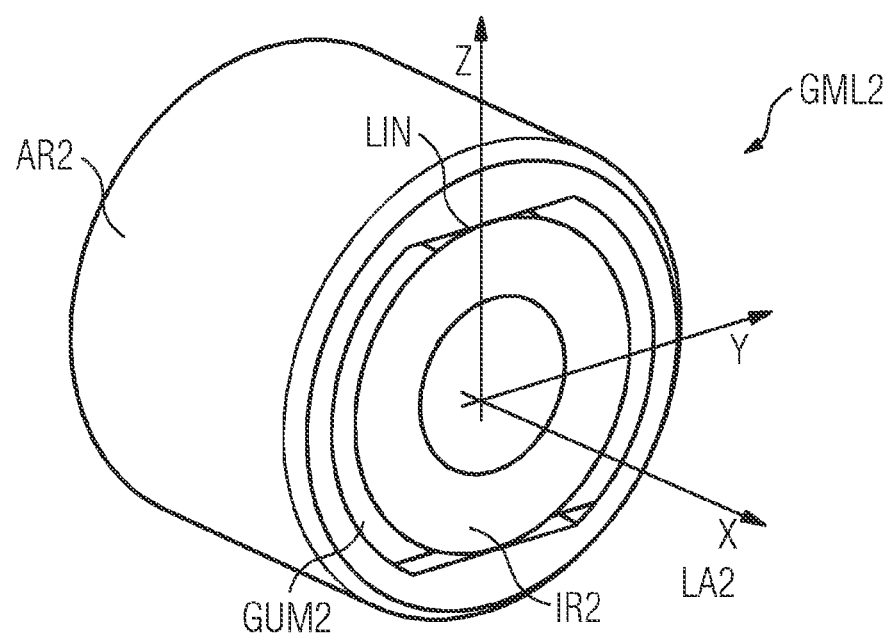
FIG. 4 shows a three-dimensional illustration of the exemplary embodiment of the present invention with respect to FIG. 3.
Figure 5:
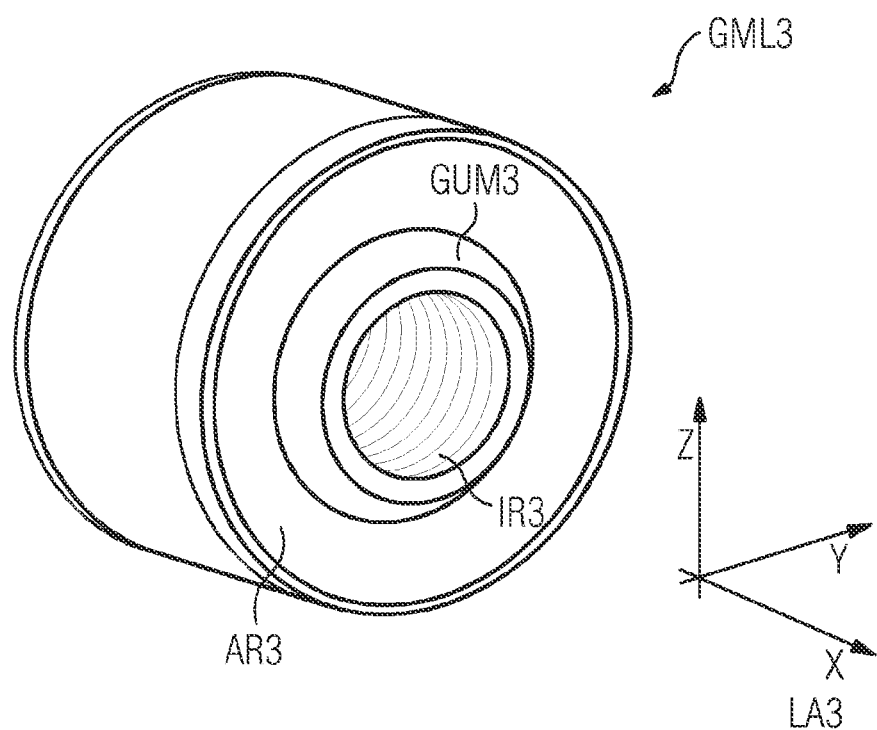
FIG. 5 shows the elastic bearing according to the known prior art that was described above in the introduction.

FIG. 4 shows a three-dimensional illustration of the exemplary embodiment of the present invention with respect to FIG. 3.

The invention claimed is:

1. An elastic bearing, comprising:
    bearing elements including an inner body, an elastic layer, and an outer body;
    said inner body having a hollow cylindrical basic shape with a longitudinal axis;
    said outer body having a hollow cylindrical basic shape with a longitudinal axis; and
    said elastic layer being formed of rubber and being disposed between said outer body and said inner body;
    said outer body enclosing said inner body with said longitudinal axis of said outer body being in line with said longitudinal axis of said inner body and said longitudinal axes forming a common bearing longitudinal axis, being a first spatial axis of a spatial coordinate system;

said outer body and said inner body, in a direction of a second spatial axis, having a minimum spacing from one another which is free of said elastic layer along a line that extends parallel to said first spatial axis;

said outer body and said inner body, in a direction of a third spatial axis, having an identical spacing from one another and said elastic layer being arranged in, and filling, said identical spacing;

wherein the elastic bearing has the following degrees of freedom:
- a rotational movement of said bearing elements about the first spatial axis;
- a rotational movement of said bearing elements about the second spatial axis;
- a translational movement of said bearing elements in the direction of the first spatial axis; and
- a translational movement of said bearing elements in the direction of the third spatial axis; and wherein the following degrees of freedom of the elastic bearing are blocked:
- a rotational movement of said bearing elements about the third spatial axis; and
- a translational movement of said bearing elements in the direction of the second spatial axis.

* * * * *